United States Patent [19]
Goldstein et al.

[11] Patent Number: 5,968,227
[45] Date of Patent: Oct. 19, 1999

[54] SYSTEM AND METHOD FOR MINIMIZING SLAG CARRYOVER DURING THE TAPPING OF A BOF CONVERTER IN THE PRODUCTION OF STEEL

[75] Inventors: Daniel A. Goldstein, Lafayette Hill; Alok Sharan, Easton, both of Pa.; Elizabeth Ann Fuchs, Livermore, Calif.

[73] Assignee: Bethlehem Steel Corporation, Del.

[21] Appl. No.: 08/970,098

[22] Filed: Nov. 13, 1997

[51] Int. Cl.$^6$ .................................................. C21C 5/28
[52] U.S. Cl. ............................ 75/375; 266/93; 266/99
[58] Field of Search ...................... 266/78, 90, 93, 266/99, 230, 45; 75/375

[56] References Cited

U.S. PATENT DOCUMENTS

| | | | |
|---|---|---|---|
| 4,140,300 | 2/1979 | Gruner et al. | 268/45 |
| 4,172,383 | 10/1979 | Iuchi . | |
| 4,222,506 | 9/1980 | Sakashita et al. . | |
| 4,465,382 | 8/1984 | Iuchi et al. . | |
| 4,687,344 | 8/1987 | Lillquist . | |
| 4,919,542 | 4/1990 | Nulman et al. . | |
| 5,094,695 | 3/1992 | Bailey et al. . | |
| 5,110,365 | 5/1992 | Carter . | |
| 5,272,340 | 12/1993 | Anbar . | |
| 5,347,128 | 9/1994 | Puram et al. . | |

FOREIGN PATENT DOCUMENTS

| | | |
|---|---|---|
| 3812560 | 10/1989 | Germany . |
| 9719955 | 12/1997 | Germany . |
| 59-02782 | 3/1984 | Japan . |
| 03017215 | 1/1991 | Japan . |

OTHER PUBLICATIONS

EPO Search Report, Jan. 13, 1999.
"Slag Carryover in Oxygen Converters: An International Review" by da Silva, et. al, Dec. 1992.
Japanese Patent Abstract JP403017215A Akihiro et al, Jan. 1991.
Japanese Patent Abstract JP359052782A Takaharu et al, May 1984.
Japanese Patent Abstract JP403134484A Akihiko et al, Jun. 1991.

*Primary Examiner*—Scott Kastler
*Attorney, Agent, or Firm*—Harold I. Masteller, Jr.

[57] ABSTRACT

A system and method for detecting molten slag in a tap stream between a steel making basic oxygen furnace (BOF) and corresponding ladle. BOFs are used in the manufacture of steel. An infrared (IR) imaging or detecting device is used to image/view the BOF-to-ladle tap stream, the steam transmitting energy indicative of whether molten steel and/or slag is in the stream at a given time. The imaging device uses mainly long IR wavelengths (e.g. wavelengths of from about 8 to 14 $\mu$m) when imaging the molten tap stream, because these wavelengths are less susceptible to being blocked or absorbed by airborne gases and particles frequently found in BOF environments. In certain embodiments, all IR wavelengths other than those greater than about 8 $\mu$m are filtered out and are not used to detect slag in the tap stream.

25 Claims, 5 Drawing Sheets

SYSTEM AND METHOD FOR MINIMIZING SLAG CARRYOVER DURING THE TAPPING OF A BOF CONVERTER IN THE PRODUCTION OF STEEL

This invention relates to a system and method for minimizing slag carryover while tapping a basic oxygen furnace (BOF) converter during the production/manufacture of steel. More particularly, this invention relates to the use of an infrared (IR) imaging detector in the far IR range (i.e. using long wavelengths) to detect the presence of slag in a tap stream during the tapping of a BOF converter.

BACKGROUND OF THE INVENTION

A long-standing problem in the steel making industry has been the ability to control or minimize the carryover of slag during the tapping of a BOF converter. Tapping is the pouring of molten metal from a BOF converter into a corresponding ladle, with the metal flowing from the converter through a taphole defined therein.

During the manufacture of steel, molten iron (known as hot metal) having impurities (e.g. C, Si, Mn, S, P, etc.) therein is typically introduced into a converter vessel known as a basic oxygen furnace (BOF). In the BOF converter, gaseous oxygen ($O_2$) is injected or jetted onto the hot metal in order to remove the impurities to desirable levels. During this purification process, fluxes such as lime (Cao) and MgO are added into the furnace and combine with oxides such as $SiO_2$, MnO, and FeO formed during the oxidation process to form molten "slag" in the converter. This slag floats on top of the molten steel in the BOF converter, because the slag's density is less than that of the molten steel.

After the oxygen is introduced into the BOF converter for an extended period of time (e.g. from about 16–25 minutes depending upon the volume of the BOF converter, the amount of molten iron therein, and the grade of the steel to be made) and the molten slag and steel have formed, the converter vessel is tilted and tapped. During tapping, molten steel is poured from a taphole in the side of the BOF converter into a ladle located below same. It is during this tapping that undesirable slag carryover can occur.

When the BOF converter vessel is properly tapped, a small amount of carryover may occur at the beginning of tapping, but the slag carryover of most concern occurs at the end of tapping when most of the substantially purified molten steel has already been poured into the ladle below, and mostly slag (instead of mostly steel) remains in the BOF converter. When a typical BOF converter is tilted to a pouring position for tapping, the molten steel is poured from the taphole located in the side of the converter before the slag is poured, due to the different densities of the two molten materials. If the operator(s) tapping the converter does not stop tapping (or pouring) at about the precise instant when the molten slag begins to flow through the taphole, the undesirable molten slag is also poured into the ladle below on top of the already poured molten steel. When too much slag is poured into the ladle from the BOF converter, this affects the cleanliness and reintroduces impurities such as phosphorus (P) into the steel, adversely affects the aluminum efficiency during tap, and prevents certain grades of steel from being made. Any attempt to remove or minimize the effect of excess slag poured into the ladle is expensive, time-consuming, and/or labor intensive. For example, if too much slag is accidentally poured into the ladle, hundreds of dollars worth of alumina or other slag modifier(s) may have to be added to the molten ladle slag to try to minimize the levels of FeO and other unstable oxides in the slag. In sum, minimizing slag carryover from the BOF converter into the ladle is essential for efficient manufacturing of high quality steel.

Many techniques have been used in an effort to control the carryover of slag during the tapping of BOF converters. For example, see *Slag Carryover in Oxygen Converters: an International Review*, by Da Silva, Bergman, and Lindfors [pp. 91–95], the disclosure of which is hereby incorporated herein by reference. In this review, numerous methods for controlling the carryover of slag during BOF converter tapping are discussed. For example, it is known to use refractory plugs, metallic plugs, wooden plugs, fiber plugs, gunned clay, dart-shaped floating elements, and ball-shaped floating elements in an attempt to control or minimize slag carryover.

Certain known techniques result in the interruption of the metal pour or tap stream from the converter near the end of tapping in order to minimize slag carryover. Dart-shaped and ball-shaped floating elements are often used for this purpose. In FIGS. 4 and 5 of the above-referenced article, the often unsatisfactory results associated with these conventional methods are illustrated. For example, dart- and ball-shaped floating elements are known to be unsuccessful when the slag is thick or viscous, and it has been found that the positioning of these floating elements inside the converter is both difficult and critical. The structure of the taphole also affects the effectiveness of these types of floating elements. As discussed in the article, some steel plants have reported that the balls sometimes close the taphole too early, which results in the leaving of purified molten steel (affecting yield) in the converter or extending the tap time (this is both expensive and inefficient). Accordingly, it is known in the art that while floating elements may help to minimize slag carryover, they are often inefficient and the results are unpredictable. Still further, both balls and darts are undesirably expensive.

Despite the fact that so many slag carryover prevention techniques are known, it is stated at the conclusion of the above-referenced article that "none of the methods in use today can be considered to be of universal application, since each has its limitations and can only reach the expected results if specific conditions exists." In other words, there has existed a longstanding need in the art for a system and corresponding method for minimizing the carryover of slag during the tapping of BOF converters, which is usable in different environments by operators of different skill levels. No known technique has, to date, been found to be satisfactory in all commercial steel-making environments because many techniques are not considered to be efficient enough and others are too expensive for use with ordinary steel grades.

In view of the inefficiency and non-effectiveness of known BOF slag carryover prevention methods, many steel plants simply rely upon operators to visually detect when the slag portion of tapping is reached. Unfortunately, this method of slag carryover prevention is inefficient at best, as it is nearly impossible for most humans to visually observe any visible difference between purified molten steel being poured from the converter taphole and molten slag being poured from the taphole [both are molten and yellow to white-hot].

U.S. Pat. No. 4,222,506 discloses another method for controlling slag carryover, primarily directed toward detecting slag in a pour from a ladle into a tundish. In the '506 patent, an infrared (IR) camera looks at the molten metal being poured and attempts to detect the presence of slag therein. Unfortunately, it has been found that the system disclosed in the '506 patent is inefficient and is incapable of easily, satisfactorily, and consistently detecting BOF-to-ladle slag in steel mill environments. In column 2 of the '506 patent, an emissivity value of about 0.28 is mentioned. As can be seen below, this emissivity value may indicate that short IR wavelengths in the short-IR region (i.e. at approximately 3–5 $\mu$m) are being measured by the camera in the '506 patent in order to detect slag. However, it is important to note that the '506 patent does not recognize or appreciate any importance to any potential wavelength. It has been found that utilizing short IR wavelengths in this range is insufficient to efficiently detect the tapping of slag in BOF-to-ladle steel mill environments. Accordingly, the '506 patent suffers from at least the following problems.

First, the environment within which a BOF converter is tapped so as to allow molten steel to flow into a ladle often includes much more airborne dust, smoke, gases, and particulate matter than ladle-to-tundish environments. During BOF converter tapping, much smoke, gas, and particulate matter is typically emitted into the air surrounding the tap stream. This, at times, makes it very difficult for humans to view the tap stream through the smoke, gases, and other airborne particulate matter. Airborne particulate matter can block radiation with wavelengths smaller than the size of the particle(s). In the BOF environment, the size of the particles is such that the long wavelengths of radiation are most likely able to reach an IR camera. Smaller wavelengths on the other hand will often be blocked. Because short (near) IR wavelengths, including those in the range indicated by the '506 patent, are susceptible to being blocked by dust and other airborne particulate matter, the system of the '506 patent at times is unable to accurately differentiate between slag and steel during tapping.

Second, the gases emitted during BOF-to-ladle tapping also have an adverse effect upon the IR wavelengths indicated by the '506 system. As will be discussed herein, gases such as $CO_2$ and $H_2O$ emitted proximate the tap stream in BOF environments absorb certain IR wavelengths, notably those in the 3–5 $\mu$m range (e.g. at about 4.2 um). Thus, in BOF environments, the wavelengths used in the '506 patent often cannot be seen by the IR camera. This is yet another problem, because, without seeing these wavelengths, the image is unclear and the '506 camera may not be able to differentiate between slag and steel during tapping.

A third problem with the slag detection system of the '506 patent is that it appears to be positioned rather close to the molten tap stream being poured from the ladle into the tundish. It has been found by the instant inventors that the positioning of an IR camera in close proximity to a tap stream sometimes results in less than satisfactory tap stream slag readings due to the high temperature background surrounding the tap stream in BOF environments. When aiming the camera at the mouth of the ladle, the background is undesirably bright slag in the ladle, and this tends to affect the clarity of the image. Because of the appearance of a "hot" background, it may be difficult to differentiate between slag and steel in the '506 patent.

In view of the above, it is clear that the system of the '506 patent is less than desirable in BOF environments for many reasons. This is believed to be a result of the '506 patent being primarily designed for detecting the presence of slag in a ladle-to-tundish environment, as opposed to a BOF-to-ladle environment where many more gases and other airborne particulate matter are present. It is noted, however, that the '506 patent does discuss and illustrate that it is also possible to use it in the work of a converter into a ladle.

Still another approach used by many in the trade to minimize slag carryover in BOF environments is the positioning of electromagnetic coils on BOF converter tapholes. By monitoring such a coil(s), it is possible to determine when slag is beginning to flow through the corresponding taphole. Upon the coil detecting slag, the taphole may be closed or the converter may be tipped upward to stop tapping. Unfortunately, electromagnetic coils are problematic in that they are positioned within the converter, and often break down or fail rather frequently. Another problem with coils is that they produce only an alarm, while the melter (i.e. operator) is still looking at the tap stream to make sure that slag is being poured before stopping tap. With slag splashing, converters operate for months and months at a time through many heats (e.g. up to about 20,000 heats or for up to one and one half years). Thus, if the coil in the taphole fails, there is no way to replace or perform maintenance on it without stopping BOF operation. In all practicality, there can be no new coil until the next BOF refractory relining. This is highly undesirable, reduces yields, cuts down on efficiency, and quickly becomes rather expensive.

It is apparent from the above that there exists a need in the art for a system and method for minimizing the carryover of slag during the tapping of a BOF converter in the manufacture of steel, wherein the system/method improves reliability relative to prior art techniques, has a higher success rate than prior art techniques, results in improved slag detection, and reduces maintenance costs relative to known techniques.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a method of detecting slag during tapping of a BOF converter in the manufacture of steel, the method comprising the steps of:

providing a BOF converter for housing molten metal, and introducing oxygen into the converter in order to form slag therein;

providing a ladle into which the molten metal from the BOF converter flows;

tapping the BOF converter so that a tap stream of molten metal flows from the BOF converter into the ladle; and IR imaging the tap stream during said tapping, using long IR wavelengths greater than or equal to about 8 $\mu$m in order to detect the presence of molten slag in the tap stream.

A basic oxygen furnance (BOF) system for use in the manufacture of steel, the BOF system comprising:

a BOF converter for holding molten steel on top of which molten slag floats during certain BOF procedures, the BOF converter including a taphole defined therein for enabling the molten steel to flow therefrom;

a ladle positioned at a vertical elevation below that of the BOF converter for receiving molten steel which flows from the BOF converter via the taphole;

an infrared (IR) imaging device for imaging a tap stream of molten metal flowing from the taphole in the converter into the ladle in order to detect the presence of slag in the tap stream; and wherein the IR imaging device uses IR wavelengths of at least about 8 $\mu$m in order to detect the presence of slag in the tap stream.

In certain preferred embodiments, the system further includes a filter for filtering out substantially all IR wavelengths less than about 8 µm so that predominantly IR wavelengths of at least about 8 µm are used to detect slag in the tap stream.

This invention further fulfills the above-described needs in the art by providing an apparatus for detecting slag in a molten tap stream flowing from a BOF to a ladle during the manufacture of steel, the apparatus comprising:

a BOF for converting molten iron into molten steel, and means for pouring the molten steel from the BOF into the ladle by way of the molten tap stream; and IR imaging means for imaging the molten tap stream in order to determine if molten slag is present in the tap stream, the IR imaging means measuring only emissivity values of molten steel in the tap stream less than about 0.25.

In preferred embodiments, the IR imaging means measures emissivity values of the molten steel in the tap stream of less than about 0.20.

This invention will now be described with respect to certain embodiments thereof, accompanied by certain illustrations, wherein:

DETAILED DESCRIPTION OF CERTAIN EMBODIMENTS OF THIS INVENTION

Referring now more particularly to the accompanying drawings in which like reference numerals indicate like parts throughout the several views.

Figure 1:
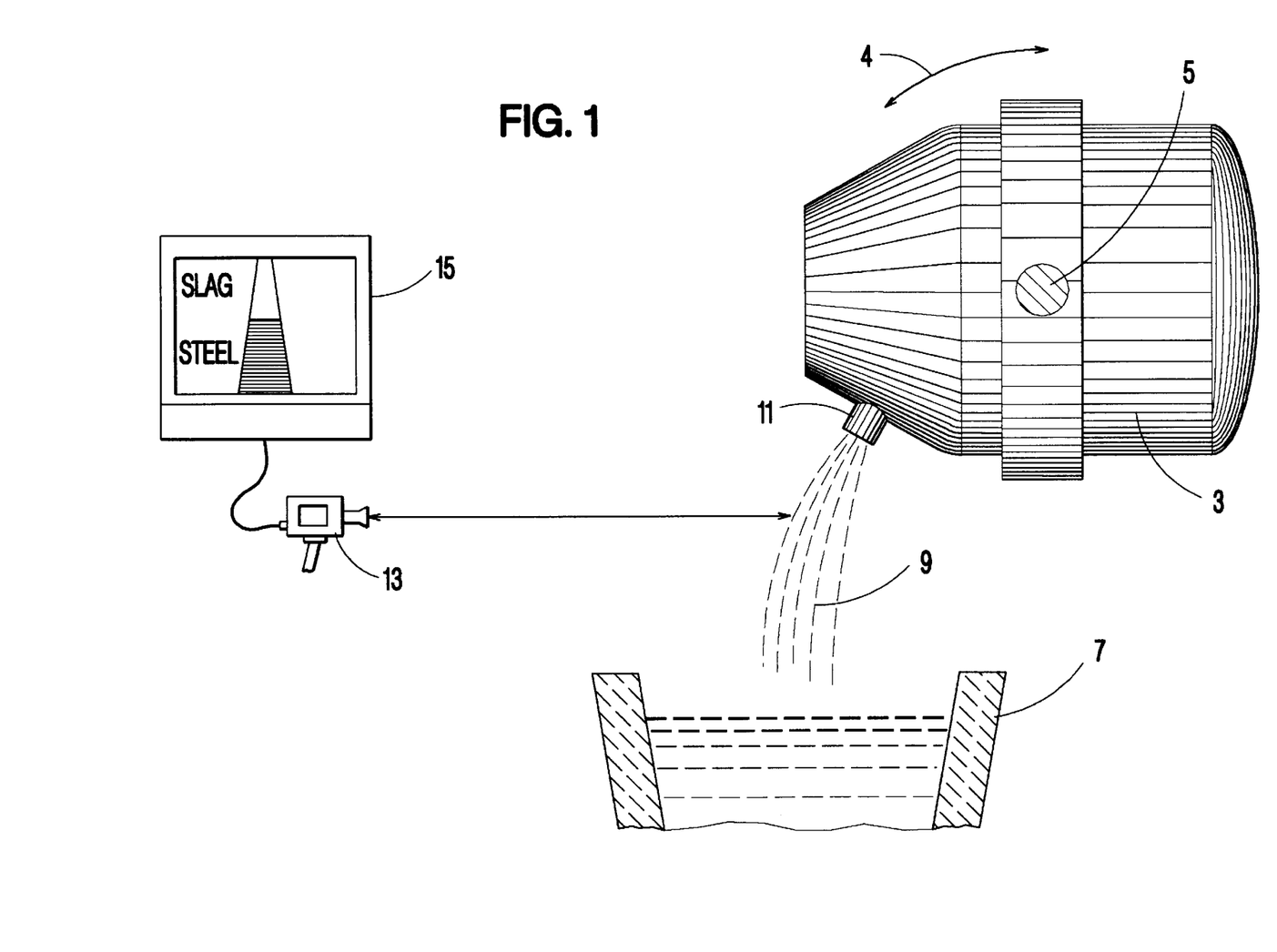
FIG. 1 is a schematic diagram illustrating a BOF-to-ladle slag detection system and method for minimizing slag carryover, according to an embodiment of this invention.

FIG. 1 illustrates a system/method for controlling and/or minimizing the carryover of molten slag into a ladle 7 during the tapping of a BOF converter 3 in the manufacture of steel, according to an embodiment of this invention. As shown, the system/method includes BOF converter 3 which is pivotable about axis 5, ladle 7 into which the molten metal 9 is poured via converter taphole 11, IR camera 13 for monitoring molten tap stream 9, and TV monitor 15. In certain embodiments of this invention, camera 13 is positioned from about 50–150 feet (preferably from about 50 to 100 feet) from tap stream 9, so as to obtain a good low temperature background relative to the molten tap stream itself, and to reduce possibilities of camera damage close to the BOF, and to provide ease of service. This location is also cleaner than locations near the BOF.

BOF converter 3 is first filled with molten iron. Thereafter, gaseous oxygen is introduced into converter 3 in order to drive off impurities. An aperture is provided at the top of the converter so as to allow the oxygen to be introduced thereinto. Upon introduction of the oxygen, the undesirable elements oxidize within converter 3 and form slag, thereby purifying the hot metal and transforming it into molten steel. Because BOF slag has a density less than that of the molten steel, the slag floats on top of the molten steel within converter 3.

After the oxygen gas has been introduced, converter 3 is pivoted or tipped 4 about fixed axis 5 so that a tap stream 9 of molten metal is poured from converter 3 into ladle 7. When properly pivoted, first steel flows out of taphole 11 into ladle 7 during tapping because the slag layer is positioned above the steel and the taphole. Thereafter, as the steel is drained from the converter 3, the operator continues to pivot the converter 3 about axis 5 until the slag layer reaches the taphole 11. The infrared (IR) camera 13 and TV monitor 15 monitor or view tap stream 9 between taphole 11 and ladle 7, in order to detect when slag begins to enter tap stream 11 and flow into ladle 7 in substantial amounts.

Surprisingly, it has been found by the instant inventors that, in contrast to the IR wavelengths indicated by the '506 patent, remarkably improved slag detection in tap stream 11 results when (i) IR camera 13 utilizes only wavelengths in the far IR range (e.g. IR wavelengths greater than or equal to about 8 µm), and/or (ii) far-IR wavelengths (e.g. greater than or equal to about 8 µm) are monitored by camera 13 and other IR wavelengths are filtered out. Upon analysis, it has been found that these longer IR wavelengths (unlike the shorter wavelengths) are less susceptible to being blocked by airborne dust particles and smoke which are prevalent in BOF environments. Still further, as will be discussed below, it has been found that the airborne gases (e.g. $CO_2$ and $H_2O$) that are commonplace in BOF environments absorb or block out near-IR and mid-IR wavelengths (e.g. from about 3–8 µm), but do not substantially absorb or block these far IR wavelengths (i.e. those greater than about 8 um). Furthermore, these longer IR wavelengths work better because at these wavelengths the difference in emissivity between slag and steel is greater, resulting in a greater change in color on the monitor. Also, because the IR camera or imager is located at a distance from the BOF, it is not at risk of damage close to the BOF and its location allows ease of service/maintenance. The instant inventors have found that when lower wavelengths are tried in the BOF, the image on the monitor is unclear and it was difficult to tell the difference between slag and steel in the tap stream.

Preferably, camera 13 is set so as to predominantly utilize IR wavelengths of at least about 8 µm (i.e. long wavelengths), and most preferably wavelengths from about 8 µm to 12 µm. The inventors have found that it is much easier to distinguish between slag and steel in a BOF tap stream at these longer wavelengths, as compared to shorter IR wavelengths, probably because of the bigger change in the emissivities of molten steel and slag at the longer wavelengths as compared to shorter IR wavelengths. When these longer wavelengths are used, camera 13 can see the BOF-to-ladle tap stream through the airborne smoke, gas, and dust that usually surrounds the BOF tap stream, whereas this cannot be done with shorter wavelengths. The slag is detected as a color change on the monitor 15, so that visual detection by the operator is effective.

The instant invention reduces maintenance costs relative to conventional slag carryover minimizing techniques, has improved reliability and efficiency relative to these techniques, and improves the manufacturer's control over slag carryover in BOF environments. By reducing BOF slag carryover, the following other advantages are obtained: FeO content in ladle slag is reduced, consumption of expensive slag modifiers is reduced, phosphorus reversion in the ladle is reduced, steel desulfurization in the ladle is improved, steel cleanliness is improved, the use of expensive slag retaining systems (e.g. darts and balls) is reduced, iron yield is improved, reliability of slag detection is improved, and there is no need to maintain leads and detector coils on the BOF itself.

Figure 5:
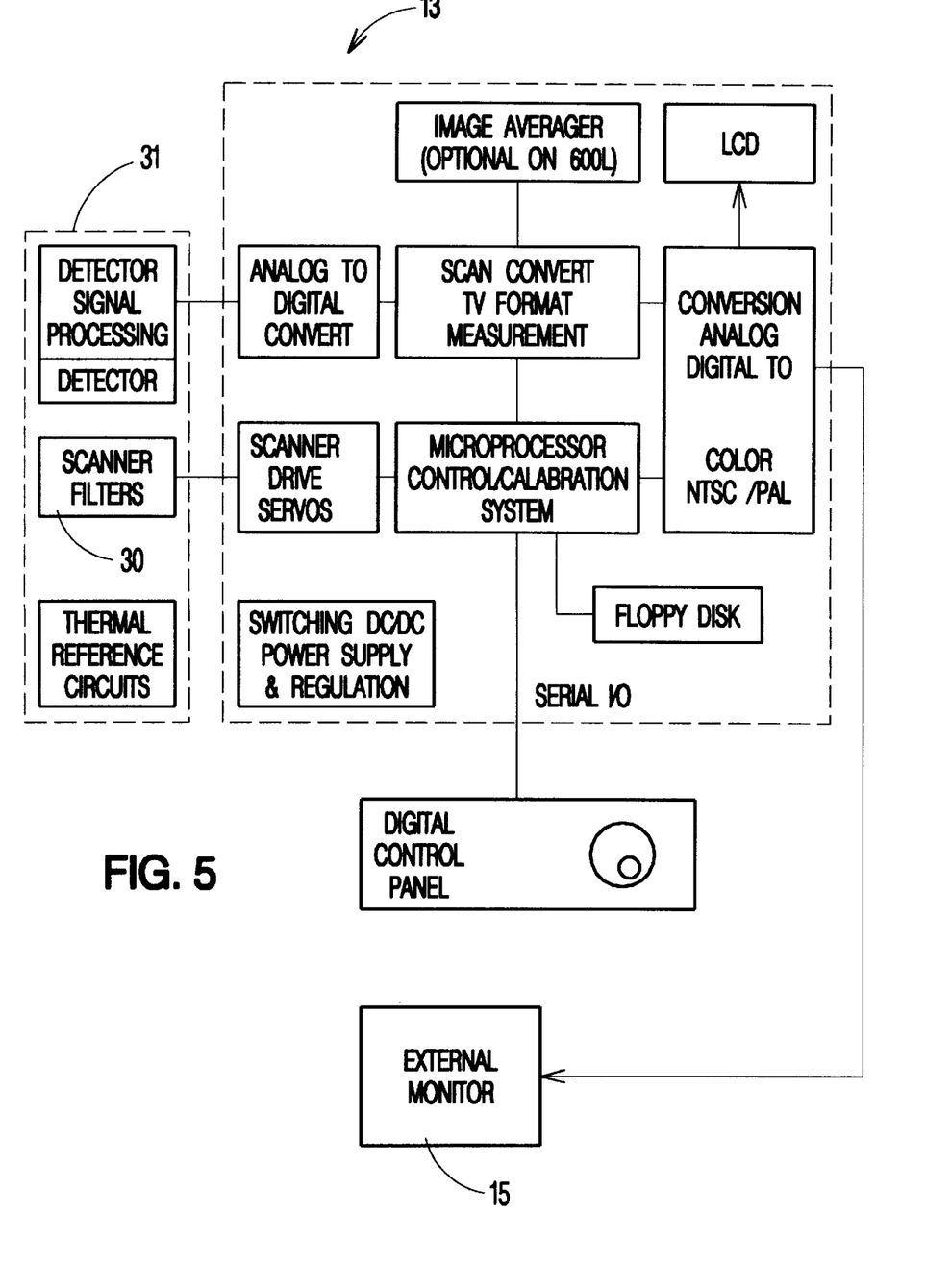
FIG. 5 is a block diagram of an IR camera that may be used in certain embodiments of this invention.

FIG. 5 is a block diagram of an IR camera 13 that may be used to monitor tap stream 9 in certain embodiments of this invention. A preferred camera 13 is a Model 760 IR imaging radiometer, available from Inframetrics, Inc. Camera 13 may be a self-contained thermal imaging, archival, and analytical system with an integral color LCD, micro floppy diskette drive and integrated cooler, which may be used with external monitor 15. The camera may include a mercury/cadmium/telluride detector that is cooled by an integrated cooler to 77 Kelvin for maximum thermal sensitivity and high spatial resolution. With regard to the camera's optical path, thermal radiation from the tap stream enters an evacuated scan module through a collimating lens, is deflected by horizontal and vertical scan mirrors, and exits through a second window to pass through the detector lens on to the detector. As illustrated, camera 13 includes circuits to process, digitize, and reformat the IR signal for display in color or black and white on the integrated LCD, and/or external video/TV monitor 15. The microprocessor accesses individual picture elements, then calculates temperatures using calibration tables corresponding to the optical filter/lens combination in use. optical filters 30 in the scanning section 31 of camera 13 can tailor the spectral response of the camera to optimize measurement of BOF tap stream 9. In preferred embodiments of this invention, a high pass filter at 30 is implemented within camera 13 to absorb or block transmission on of IR wavelengths of from about 0–8 μm, thereby enabling camera 13 to monitor the tap stream by only using far IR wavelengths greater than or equal to about 8 μm (i.e. the longwave IR region). In certain embodiments, the high pass filter allows substantial transmission of only IR wavelengths of from about 8–14 μm, or 8–12 μm, and substantially blocks transmission into and/or through the camera's scanner of all other IR wavelengths. On the above-referenced preferred camera, this high pass filter is selected by name in a SETUP menu, and inserted automatically. Using this filter(s), camera 13 responds to the sum of the emitted, reflected, and transmitted energies coming from the tap stream. This combination of energies is called the stream's radiosity. To obtain the stream's temperature, the emitted energy is extracted by subtracting the reflected and transmitted energies from the incoming radiosity. The result is scaled up by the emittance to obtain a blackbody equivalent value that may be converted to temperature by querying a calibration look-up table. The resultant temperature of the tap stream, showing color (and emissivity) differences between the molten steel and slag, is shown on monitor 15. While the above-identified IR imaging camera 13 is used in certain embodiments of this invention, it will be appreciated by those of skill in the art that other types of IR imaging devices/cameras may instead be used, so long as they are capable of using long IR wavelengths to detect slag in the tapstream, and preferably are capable of filtering out other IR short wavelengths (i.e. microbolometers).

When these selected wavelengths are utilized by IR camera 13 to view tap stream 9, the emissivity difference between the molten slag and molten steel on TV monitor 15 becomes readily apparent. Referring to FIG. 1, the molten steel in tap stream 9 appears rather dark compared to the molten slag, and when slag begins to enter tap stream 9 such slag appears on monitor 15 as a color (e.g. bright white) which is much different than that of the steel. As shown in the FIG. 1 embodiment, the slag is represented by a white color, while the steel by a darkened color. This enables tapping operators to easily determine when slag has entered the tap stream 9 so that an operator(s) can stop tapping or pouring when a substantial white coloring appears in stream 9 on monitor 15. Thus, when the operator looks at monitor 15 and sees that slag is beginning to dominate tap stream 9, he stops tapping by either upwardly tilting converter 3 about axis 5 or closing taphole 11. In such a manner, excessive slag carryover from converter 3 into ladle 7 is avoided.

According to certain embodiments of this invention, tapping of BOF converter 3 can be automatically stopped or halted when camera detects a predetermined amount of slag in tap stream 11. For example, using gray scale comparison ratios, the tapping system can be programed to stop (i.e. tilt the converter upward or upright) when contrast in the monitored tap stream reaches a predetermined level indicating the presence of a predetermined amount of slag in the tap stream. According to still further embodiments of this invention, the tilting of the BOF converter during tapping can be controlled by the amount of slag detected by camera 13 in the tap stream. For example, at the beginning of tapping, the system can be programmed to tilt the converter 3 to a degree where less than a predetermined amount of slag is being poured from the tap hole 11 into ladle 7, and the tilt angle of converter 3 can be adjusted in accordance with the program so as to minimize slag in the tap stream. Then, as set forth above, when a predetermined amount of slag (a predetermined emissivity difference) is detected in the tap stream after tapping for a predetermined amount of time (i.e. near the end of tapping), the system can automatically stop tapping. By correcting tilt angle of the BOF converter during tapping, the presence of slag in the stream can be substantially eliminated until the end of tapping.

Figure 2:
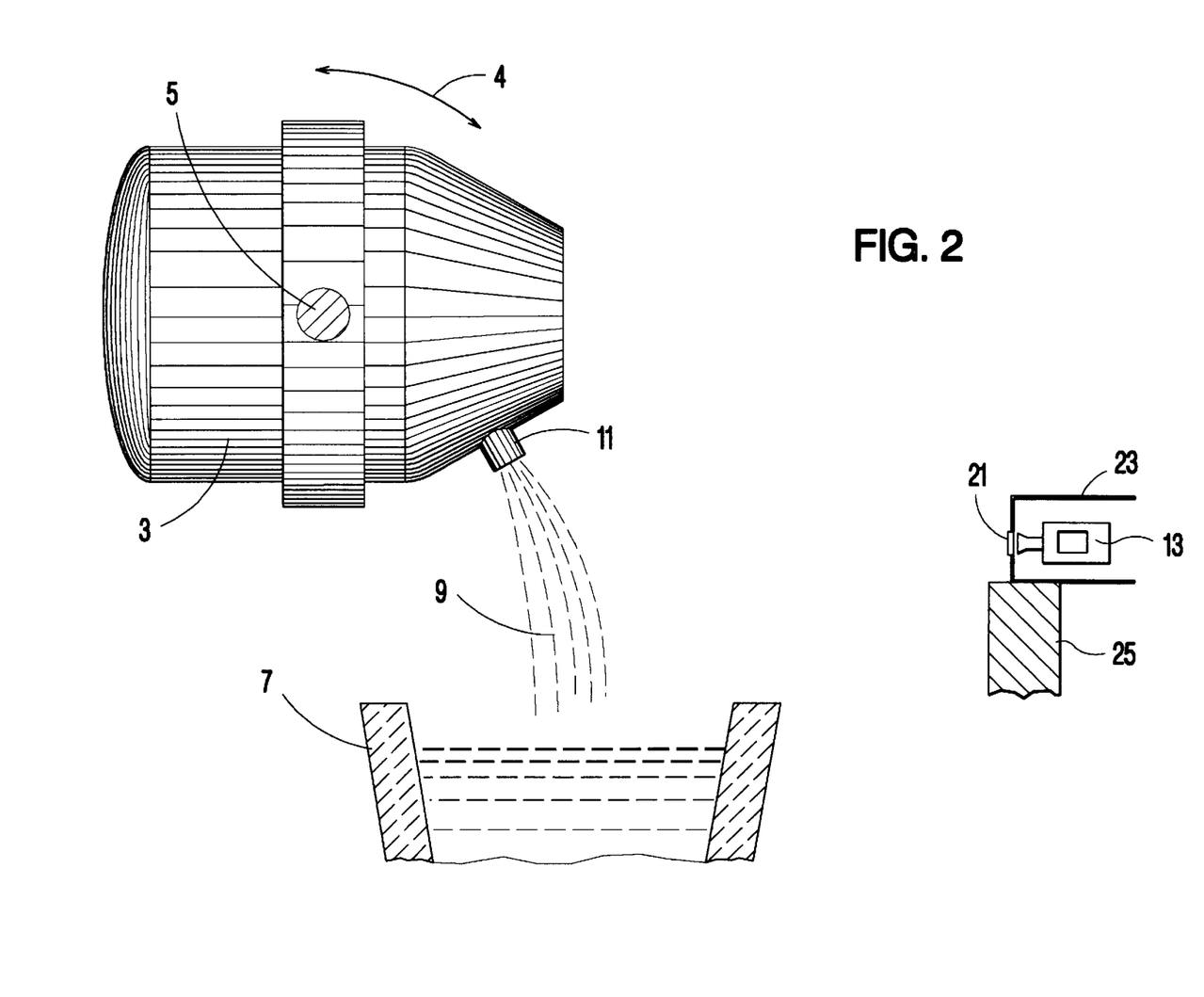
FIG. 2 is a perspective, partial cross-sectional, view illustrating another embodiment of this invention similar to the FIG. 1 embodiment.

FIG. 2 illustrates an embodiment of this invention that is similar to the FIG. 1 embodiment, except that converter 3 and ladle 7 have different structural characteristics. Converter 3 still pivots about axis 5 to pour molten metal stream 9 out of taphole 11. When camera 13 detects slag in stream 9, an operator may stop tapping as discussed above. Another significant characteristic regarding the FIG. 2 embodiment is the presence of circular or rectangular window 21 located within camera housing 23. Camera 13 is mounted on structure 25 within housing 23, so that the camera views tap stream 9 through window 21. In preferred embodiments of this invention, window 21 is transmissive to far IR wavelengths (e.g. IR wavelengths greater than about 8 μm). In certain embodiments, window 21 is made of glass that is substantially transmissive or transparent to all or only some IR wavelengths. However, window 21 need not be transparent to non-IR wavelengths in certain embodiments.

In certain embodiments, window 21 is made of a substantially transparent monocrystalline material including calcium fluoride, this being a non-hidroscopic window. Such a window is available from Heise's Online Thermographic Services (H.O.T.S.), located in Knoxville, Tenn., as its H.VIR Comet window 21. This window is about 95+% transmissive of IR wavelengths and nearly 100% transmissive of visual wavelengths. Also, longwave inspection windows 21 from HOTS are also available, such as model no. H.VIR 75 which is transmissive at least about 95% (e.g. 98%) to IR wavelengths of 8–12 um, such a window having no UV sensitivity, and a thermal conductivity of about 11.72 W/mK at 13 degrees C. This type of window may or may not be transmissive to other wavelengths outside of the 8–12 um range. Preferably, window 21 has a transmission of at least about 95% for IR wavelengths greater than about 8 um.

In other embodiments, window 21 may include ZnSe, GaAs, Germanium, CdTe, or ZnS, and have similar characteristics to those described above. However, coatings may be required on some of these alternative windows, such as ZnSe inclusive windows.

Window 21 is in addition to possible filters located within camera 13 which allow an operator to selectively determine which wavelengths camera 13 utilizes. Different materials can be used as window 21, and the use of this window instead of a filter is for the protection of the camera. An important characteristic of the window is that it has a high transmittance in the 8–12 um range, and thus we are able to use the IR camera or imager with its own 8–12 um filters.

Figure 3:
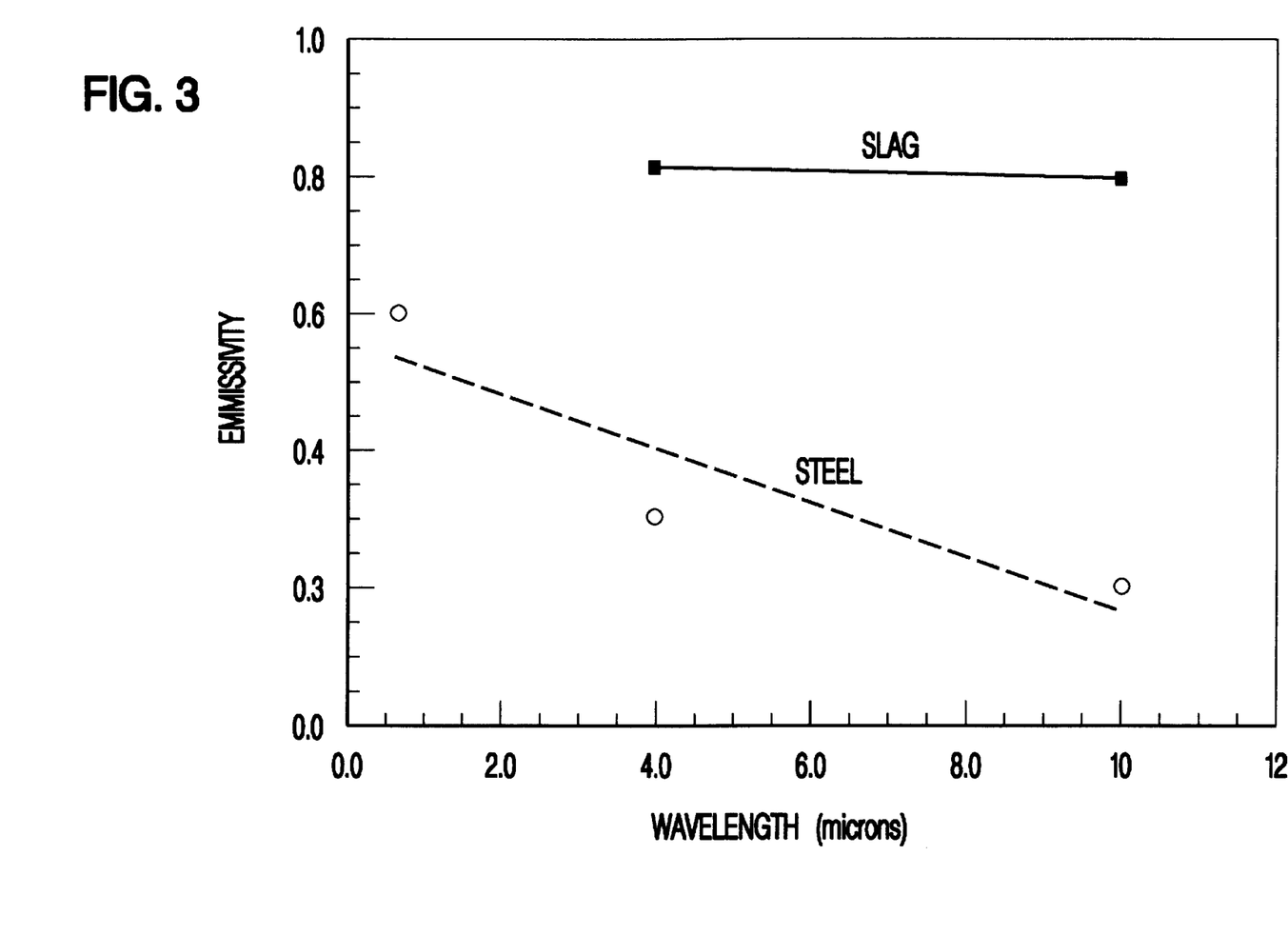
FIG. 3 is an emissivity v. wavelength (µm) graph illustrating an emissivity v. wavelength plot of both molten slag and molten steel.

FIG. 3 is an emissivity v. wavelength graph illustrating how the emissivity of both slag and steel vary as a function of IR wavelength. As can be seen, when only far IR wavelengths (e.g. at least about 8 $\mu$m) are utilized to determine if there is slag within a molten steel tap stream, it is more easily detectable than at other wavelengths because of the greater difference between the emissivity of steel and slag at these higher wavelengths.

Figure 4:
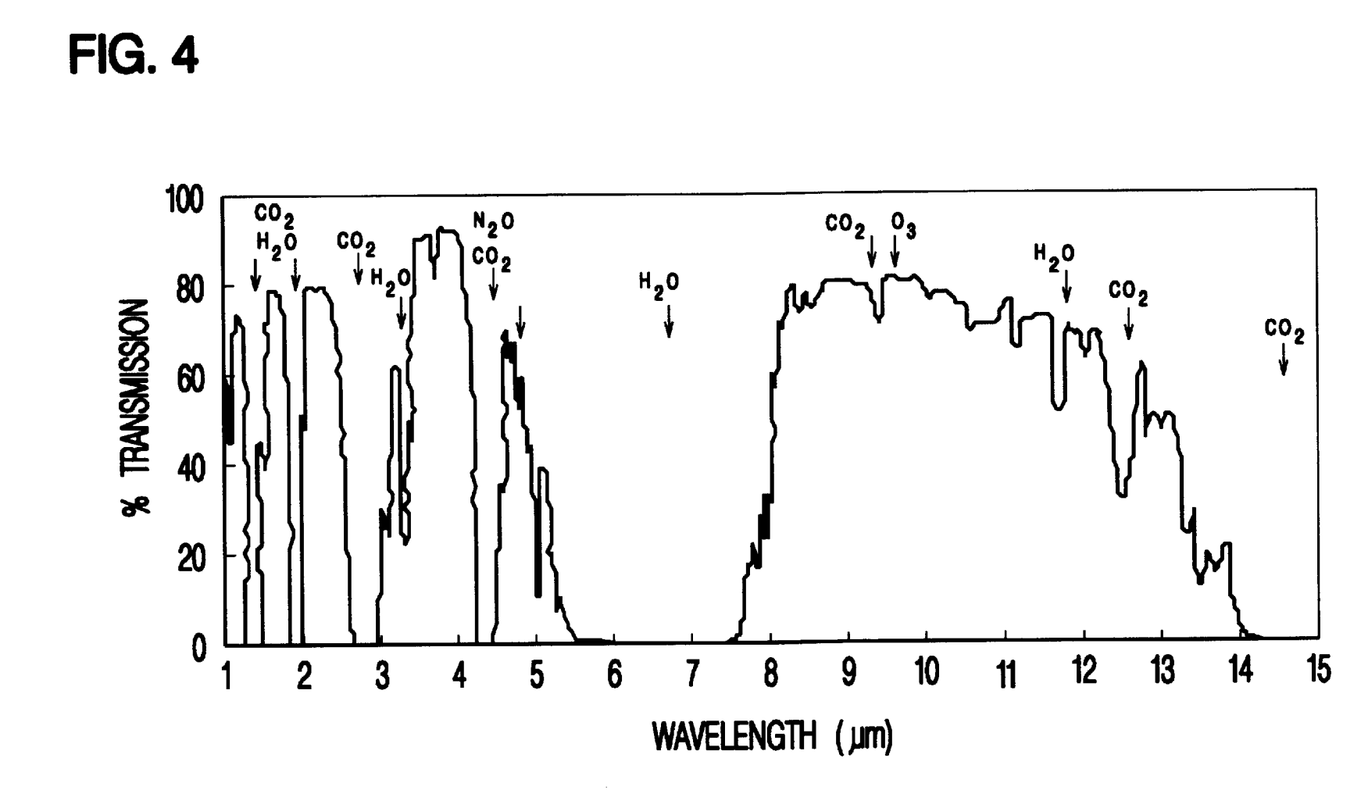
FIG. 4 is a percentage transmission v. wavelength (µm) plot for the total IR region, illustrating how certain airborne gases present in BOF environments absorb particular IR wavelengths, and reduce their utility.

FIG. 4 is a transmission v. IR wavelength graph illustrating the extent to which particular gases absorb (i.e. prevent transmission) of certain IR wavelengths. For example, it is noted that $H_2O$ gas substantially absorbs a large portion of the wavelengths between 5 and 8 $\mu$m. In a similar manner, it is noted that $H_2O$ and/or $CO_2$ absorb many wavelengths between 1 and 5 $\mu$m. This graph illustrates that the greatest transmission through these gases (e.g. $CO_2$, $O_3$, $H_2O$) takes place when wavelengths from about 8–14 um are utilized. Because $CO_2$ and $H_2O$) are gases which frequently exist proximate BOF tap streams, it can be seen that the slag and steel in a BOF tap stream can be more easily seen/detected using high IR wavelengths (e.g. wavelengths of at least about 8 $\mu$m).

According to alternative embodiments of this invention, the camera and monitor of any embodiment discussed herein can be used with an electric furnace in the production of steel, instead of in a BOF. Electric furnaces typically are exposed to environments similar to those surrounding BOFs, and electric steel-making furnaces have selectively opened/closed bottom output ports from which molten steel flows into a ladle located below same (i.e. there is no side taphole). In these embodiments, camera 13 views/images the molten hot metal stream flowing from the furnace's bottom output port into the ladle, and detects the presence of slag therein in any manner set forth above.

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A method of detecting slag during tapping of a BOF converter in the manufacture of steel, the method comprising the steps of:
   providing a BOF converter for housing molten metal, with oxygen being introduced into the converter in order to form slag within the converter;
   providing a ladle into which the molten metal from the BOF converter flows;
   tapping the BOF converter so that a tap stream of the molten metal flows from the BOF converter into the ladle; and
   IR imaging the tap stream during said tapping using long IR wavelengths greater than or equal to about 8 $\mu$m in order to detect the presence of molten slag in the tap stream.

2. The method of claim 1, further comprising the step of stopping tapping of the BOF converter when a predetermined amount of slag is detected in the tap stream.

3. The method of claim 1, wherein during said IR imaging, emissivity values of the slag in the molten metal tap stream between about 0.7 and 0.9 are imaged and output on a monitor, and emissivity values of molten steel in the molten metal tap stream of less than about 0.25 are imaged and output on the monitor.

4. The method of claim 3, wherein during said IR imaging emissivity values of the molten steel in the tap stream of less than about 0.20 are imaged and output on the monitor in order to indicate when slag is present in the tap stream.

5. The method of claim 1, wherein during said IR imaging of the tap stream, only IR wavelengths greater than or equal to about 8 $\mu$m are imaged and output on a corresponding monitor so that an operator can tell when slag is present in the tap stream by looking at the image on the monitor.

6. The method of claim 5, further comprising the step of substantially filtering out wavelengths less than about 8 $\mu$m during said IR imaging so that long IR wavelengths are used to detect the presence of slag in the tap stream.

7. The method of claim 6, further comprising the step of filtering out all IR wavelengths less than about 8 $\mu$m during said IR imaging so that image data from these filtered out wavelengths is not used to detect the presence of slag in the tap stream.

8. A basic oxygen furnace (BOF) system for use in the manufacture of steel, the BOF system comprising:
   a BOF converter for holding molten steel and molten slag, the molten slag floating on top of the molten steel, said BOF converter including a tap hole defined therein for enabling the molten steel to flow therefrom;
   a ladle positioned at a vertical elevation below the BOF converter for receiving molten steel which flows from the BOF converter via the tap hole in a tap stream;
   an infrared (IR) imaging device for imaging the tap stream of molten steel and molten slag flowing from the tap hole in the converter into the ladle in order to detect the presence of slag in the tap stream; and
   wherein the IR imaging device uses IR wavelengths of at least about 8 $\mu$m in order to detect the presence of slag in the tap stream.

9. The system of claim 8, further including a filter for filtering out all IR wavelengths less than about 8 $\mu$m so that predominantly IR wavelengths of at least about 8 $\mu$m are used to detect slag in the tap stream.

10. The system of claim 8, further comprising a housing within which said IR imaging device is mounted, said housing and said IR imaging device being located from about 50 to 150 feet from the tap stream.

11. The system of claim 10, wherein said housing includes a housing window which is substantially opaque to certain IR wavelengths between 0 and 8 $\mu$m and is substantially transparent to certain IR wavelengths greater than bout 8 um, said IR imaging device being positioned within said housing so as to view the tap stream through said housing window.

12. The system of claim 8, further including a filter in said IR imaging device for filtering out certain IR wavelengths between about 0 and 8 $\mu$m and a window in a housing enclosing said IR imaging device also for blocking out certain IR wavelengths between about 0 and 8 $\mu$m, and wherein the imaging device optically views the tap stream through each of said filter and said window.

13. The system of claim 12, wherein said filter filters out, or is opaque to, all IR wavelengths between about 0 and 8 μm.

14. An apparatus for detecting slag in a molten tap stream flowing from a basic oxygen furnace (BOF) into a ladle during the manufacture of steel, the apparatus comprising:

a basic oxygen furnace (BOF) for converting molten iron to molten steel, and for pouring said molten steel from the BOF into the ladle in the form of the molten tap stream; and IR imaging means for imaging said molten tap stream in order to determine if slag is present in said tap stream, said IR imaging means measuring only emissivity values of molten steel in said tap stream less than about 0.25.

15. The apparatus of claim 14, wherein said IR imaging means measures emissivity values of the molten steel in the tap stream less than about 0.20.

16. The apparatus of claim 14, further comprising means for filtering out emissivity values of the molten steel in said tap stream that are greater than about 0.25.

17. The apparatus of claim 16, wherein all molten steel emissivity values greater than about 0.25 are filtered out and are not used to determine whether slag is present in said tap stream.

18. A method of pouring molten metal from a steel-making vessel into a ladle during the manufacture of steel, the method comprising the steps of:

providing a steel-making vessel holding a volume of molten metal, the molten metal including molten steel and molten slag;

providing an IR imaging camera for monitoring a stream of molten metal flowing from the vessel into the ladle;

causing molten metal to flow in the stream out of the vessel through a hole defined therein, and downward into the ladle;

monitoring the stream with the IR imaging camera using IR wavelengths between about 8 and 14 μm so that emissivity differences in the stream between molten steel and molten slag are displayed on a corresponding monitor;

viewing the monitor in order to determine when a substantial amount of slag enters the stream; and observing a substantial change in color in the stream on the monitor which indicates a substantial amount of slag in the stream flowing from the vessel into the ladle, and the operator in response thereto stopping the pouring of the molten metal and minimizing slag carryover into the ladle.

19. The method of claim 18, wherein the vessel is a one of a BOF converter and an electric steel-making furnace.

20. A system for determining when molten slag is present in substantial amounts in a BOF-to-ladle tap stream, the system comprising:

a BOF having at least one tap hole defined therein;

a ladle located at an elevation below the BOF;

a housing within which an imaging device is positioned, said imaging device for imaging the BOF-to-ladle tap stream in order to determine when molten slag is present therein in substantial amounts; and a window defined in said housing, said window being at least about 95% transparent to long infrared (IR) wavelengths, and wherein said imaging device images said tap stream through said window.

21. A steel-making apparatus comprising:

a steel-making vessel for holding molten hot metal including slag and steel;

an opening in said vessel for allowing the molten hot metal to flow from said vessel downward into a ladle by way of a stream of the hot metal;

an infrared (IR) imaging device for imaging the stream of hot metal flowing between the opening and the ladle in order to detect the presence of slag in the stream; and wherein the IR imaging device used IR wavelengths of at least about 8 um in order to detect the presence of slag in the tap stream.

22. The apparatus of claim 21, wherein said vessel is a BOF and said opening is a tap hole defined in a side portion of said BOF.

23. The apparatus of claim 21, wherein said vessel is an electric steel-making furnace and wherein said opening is defined at a bottom of said furnace.

24. A system for detecting slag in a stream, the system comprising:

a vessel for pouring a stream of molten metal, the stream including both molten steel and molten slag;

an imaging device for imaging the stream in order to detect the presence of slag therein, wherein said imaging device uses IR wavelengths of at least about 8 μm in order to detect the presence of slag in the stream.

25. The system of claim 20, wherein said window is at least about 98% transmissive to certain IR wavelengths greater than about 8 um, and includes one of calcium fluoride, ZnSe, ZnS, CdTe, GaAs, and germanium.

* * * * *